United States Patent
Wernimont

(10) Patent No.: US 9,694,916 B2
(45) Date of Patent: Jul. 4, 2017

(54) METHOD, APPARATUS AND COMPOSITION FOR A PAYLOAD DELIVERY SYSTEM FOR DELIVERY OF RADIOACTIVE HIGH LEVEL WASTE PAYLOADS TO SUN STORAGE

(71) Applicant: Eric John Wernimont, Oceanside, CA (US)

(72) Inventor: Eric John Wernimont, Oceanside, CA (US)

(73) Assignee: Eric John Wernimont, Oceanside, CA (US)

( * ) Notice: Subject to any disclaimer, the term of this patent is extended or adjusted under 35 U.S.C. 154(b) by 136 days.

(21) Appl. No.: 14/707,664

(22) Filed: May 8, 2015

(65) Prior Publication Data

US 2016/0325855 A1  Nov. 10, 2016

(51) Int. Cl.
| | | |
|---|---|---|
| *B64C 37/02* | (2006.01) | |
| *B64D 5/00* | (2006.01) | |
| *B64G 1/00* | (2006.01) | |
| *B64G 1/40* | (2006.01) | |
| *B64D 1/08* | (2006.01) | |

(52) U.S. Cl.
CPC ............ *B64G 1/005* (2013.01); *B64D 1/08* (2013.01); *B64G 1/401* (2013.01)

(58) Field of Classification Search
CPC .......... B64D 1/08; B64G 1/005; B64G 1/401
See application file for complete search history.

(56) References Cited

U.S. PATENT DOCUMENTS

| 6,921,051 B2 | 7/2005 | Lopata |
| 2011/0218378 A1 | 9/2011 | Adinolfi |

FOREIGN PATENT DOCUMENTS

| EP | 0564651 A1 | 1/1993 |
| EP | 0612079 A1 | 8/1994 |

OTHER PUBLICATIONS

"Pegasus User's Guide". Orbital. Release 6.0. Jun. 2007. https://snebulos.mit.edu/projects/reference/launch_vehicles/OSC/Pegasus_User_Guide.pdf.*
"Development of Hydrogen Peroxide Monopropellant Rockets". ESA.2006 http://www.esa.int/gsp/ACT/doc/PRO/ACT-RPR-PRO-JPC2006-HP%20Rockets%202006-5239.pdf.*
"NASA X-43, United States of America".aerospace-technology. 2004 http://www.aerospace-technology.com/projects/x43/.*
Wikipedia, long-lived fission product, http://en.wikipedia.org/wiki/Long-lived_fission_product. as of Feb. 18, 2015.
U.S. DOE Office of Civilian Waste Management. Analysis of the System Life Cycle Cost of the Civilian Radioactive Waste Management Program, Fiscal Year 2007. Washington, D.C.
(Continued)

*Primary Examiner* — Philip J Bonzell

(57) ABSTRACT

A method, apparatus and composition are described for a payload delivery system capable of moving a radioactive high level waste payload from the Earth to being captured by the Sun. The payload delivery system comprises a rocket system capable of being carried and launched from an aircraft. The rocket system has at least one stage that utilizes one and only one propellant being a single liquid propellant and a final stage that utilizes pneumatic cannon driven by the final stage combustion or ullage gases to propel the radioactive high level waste payload toward the Sun.

2 Claims, 2 Drawing Sheets

(56) References Cited

OTHER PUBLICATIONS

Blue Ribbon Commission on America's Nuclear Future. Disposal Subcommittee Report to the Full Commission Updated Report. Washington D.C.; Jan 2012.
Coopersmith J. Disposal of High-Level Nuclear Waste in Space. 1999: Space Studies Institute.
Wikipedia, Radioisotope thermoelectric generator, http://en.wikipedia.org/wiki/Radioisotope_thermoelectric_generator. as of Nov. 6, 2014.
National Museum of the US Air Force: U.S. Army cut-away of the V-2. http://www.nationalmuseum.af.mil/shared/media/photodb/photos/090928-F-1234S-011.jpg as of Apr 30, 2015.
Whitehead JC, Pittenger LC, Colella NJ. ASTRID Rocket Flight Test. Lawrence Livermore National Labs Energy & Technology Review. Jul. 1994; https://str.llnl.gov/etr/pdfs/07_94.
Whitehead JC. Self Pressurizing HTP Feed Systems. 2nd International Hydrogen Peroxide Propulsion Conference; Nov. 7-10, 1999; West Lafayette, IN. Lawrence Livermore National Lab.
Ledebuhr AG, Antelman DR, Dobie DW et al. Recent Development in Hydrogen Peroxide Pumped Propulsion. 2nd Missile Defense Conference and Exhibit: Mar. 22-26, 2004; Washington.
Wikipedia, Pegasus (rocket), https://en.wikipedia.org/wiki/Pegasus_(rocket) as of Sep. 18, 2016.
Kassebom M., et al., "Orbcomm—System Status, Evolution and Applications", DLR/Koln-Porz, Mar. 27-28, 2003.
Matney, M., et al, "Characterization of the Breakup of the Pegasus Rocket Body 1994-029B", Second European Conference on Space Debis, Mar. 1997.
Wikipedia, Escape Velocity, https://en.wikipedia.org/wiki/Escape_velocity as of Feb. 26, 2017.

* cited by examiner

METHOD, APPARATUS AND COMPOSITION FOR A PAYLOAD DELIVERY SYSTEM FOR DELIVERY OF RADIOACTIVE HIGH LEVEL WASTE PAYLOADS TO SUN STORAGE

CROSS-REFERENCE TO RELATED APPLICATIONS

This application claims priority to U.S. Provisional Patent Application No. 62/121,309, filed Feb. 26, 2015, entitled "Method, Apparatus and Composition for a Flight System for Delivery of Radioactive High Level Waste Payloads to Sun Storage" and the disclosure of which are incorporated herein by reference.

TECHNICAL FIELD

Embodiments of the present invention are generally directed toward payload delivery systems in which the payload escapes the gravitational attraction of Earth. In addition, the present invention relates to non-terrestrial storage of nuclear waste within the Sun.

BACKGROUND ART

It is well known that nuclear fission has been utilized for electric power generation for over fifty years. As a process nuclear fission involves breaking apart larger atoms which in turn leads to smaller atoms. These smaller atoms are generally radioactive and some exhibit half-lives that are greater than 200,000 years such as tin-126, for example. A few others have even longer half-lives which can exceed 10 million years such as iodine-129, for example (Wikipedia: long-lived fission product. [accessed 2015 Feb. 18]. http://en.wikipedia.org/wiki/Long-lived_fission_product). These radioactive materials with half-lives in excess of 200,000 years are commonly referred to as high level waste (HLW). Because the half-lives are so long these materials represent a human health hazard requiring isolation for many hundreds of thousands of years. The United States (U.S.) has sought a technical, cost effective, environmentally and publicly acceptable solution to the storage of this material since the 1970s. At present there are well over 250 million pounds of HLW in the U.S. alone. In the late 2000s Yucca Mountain was approved by the Department of Energy (DOE) but subsequently the Obama administration suspended the license. As it stands the Yucca Mountain complex design was designated Environmental Protection Agency (EPA) compliant for a mere 10,000 years (U.S. Department of Energy Office of Civilian Waste Management. Analysis of the System Life Cycle Cost of the Civilian Radioactive Waste Management Program, Fiscal Year 2007. Washington, D.C.; July 2008. Report DOE RW-0591 & Blue Ribbon Commission on America's Nuclear Future. Disposal Subcommittee Report to the Full Commission Updated Report. Washington D.C.; January 2012.).

The Yucca Mountain plans call for a 100 year period of observation of the HLW after which all openings to the surface will be backfilled. However, the Yucca Mountain plans for activities after 100 years are unplanned other than to establish a plan at that time for the remaining million or so years that the HLW will need to be safe guarded (U.S. Department of Energy Office of Civilian Waste Management. Analysis of the System Life Cycle Cost of the Civilian Radioactive Waste Management Program, Fiscal Year 2007. Washington, D.C.; July 2008. Report DOE RW-0591).

Another proposed option for long term storage of HLW is for disposal in space. This option was studied in the 1970s and it was concluded that the option was technically viable but the costs were prohibitive and the environmental risks associated with a failed launch too great for large scale launch of radioactive HLW (Coopersmith J. Disposal of High-Level Nuclear Waste in Space. 1999: Space Studies Institute). However, radioactive material has been launched into space (but only as an auxiliary component of other much larger payloads) and stored there in the form of Radioisotope Thermoelectric Generators (RTG) used to power various deep space probes. The material commonly used to power those RTGs is plutonium-238 with fuel quantities around 2 pounds to just over 15 pounds. For example, the Mars Curiosity Rover utilizes a fuel that contains roughly 9 pounds of plutonium-238. In addition, for the small radioactive RTGs U.S. launch accidents have occurred without contamination and current cask container design has been thoroughly studied for this particular hazard (Wikipedia: Radioisotope thermoelectric generator. [accessed 2014 Nov. 06]. http://en.wikipedia.org/wiki/Radioisotope_thermoelectric_generator).

Hence, at present there exists no viable option for long term storage of radioactive HLW and as such the waste is generally stored where it is produced, such as reactor stations, awaiting a solution. What is needed is a viable option to solve this issue that grows every day. The present patent disclosure provides for a solution in that the radioactive HLW is permanently removed from the Earth using a payload delivery system. The payload delivery system solves the technical problem of long term storage and in addition solves the environmental and public concerns associated with launch risk by use of a small payload of a few pounds, for example. In addition the small payload solves other problems with space storage of radioactive HLW (environmental and public acceptance) and with economics of mass production could eventually reduce the costs to an acceptable level. The solution to the problem in this disclosure can also act as starting point eventually leading to the launching of successively larger and larger payloads and thereby overcome the economics of space disposal of radioactive HLW.

The present disclosure concerns small payloads (e.g., less than 10 pounds) which typically require small rocket stages as part of the payload delivery system. However, conventional small rocket stages often have a very low propellant mass fraction, an inefficiency which leads to lower deliverable payload mass. Conventional payload delivery systems involving rocket stages often carry different propellants to serve different functions within a rocket stage. For example, the German V-2 rocket was a single stage rocket system which utilized liquid oxygen as oxidizer and ethanol as liquid fuel in the stage main propulsion engine. In addition, liquid hydrogen peroxide decomposition (by liquid permanganate solution) was used to drive the turbopumps, and pressurized gaseous nitrogen was used as the pressurant for each of the aforementioned liquids (National Museum of the US Air Force: U.S. Army cut-away of the V-2. [accessed 2015 Apr. 30]. http://www.nationalmuseum.af.mil/shared/media/photodb/photos/090928-F-1234S-011.jpg,). In all, the German V-2 single stage rocket system used five different propellants. Use of multiple propellants with conventional rocket stages, such as the German V-2, lead to lower propellant mass fraction and hence lower delivered payload generally because all the different propellants require tanks, valves and other control devices. In fact, use of conventional propellants in small stages has such a low propellant mass fraction that the overall system may not be able to deliver the required payload. What is needed is a small rocket stage that uses a minimum amount of propellants. In contrast to conventional rocket stages, use of a single propellant to perform all of the functions on a stage, for example, can permit minimization of tanks and handling apparatus; such minimization directly translates into a reduced inert mass of a stage, which then directly translates into a high propellant mass fraction and further into higher deliverable payload mass. This minimization of tanks, etc. is especially critical for small-sized rocket stages. Examples of single liquid propellant self-pressurization configurations which would be subsystems of a single liquid propellant stage using the monopropellants of hydrazine and hydrogen peroxide are provided by Whitehead, Whitehead et al. and Ledebuhr et al. (Whitehead J C, Pittenger L C, Colella N J. ASTRID Rocket Flight Test. Lawrence Livermore National Labs Energy & Technology Review. July 1994 [accessed 2015 Apr. 29]; https://str.llnl.gov/etr/pdfs/07_94.2.pdf), (Whitehead J C. Self Pressurizing HTP Feed Systems. $2^{nd}$ International Hydrogen Peroxide Propulsion Conference; 1999 Nov. 7-10; West Lafayette, Ind. Lawrence Livermore National Labs Report UCRL-JC-136124) and (Ledebuhr A G, Antelman D R, Dobie D W et al. Recent Development in Hydrogen Peroxide Pumped Propulsion. $2^{nd}$ Missile Defense Conference and Exhibit: 2004 Mar. 22-26; Washington, D.C. Lawrence Livermore National Labs Report UCRL-CONF-203137).

SUMMARY

Embodiments of the present invention are related to a payload delivery system which propels a small radioactive HLW payload (for example, under 10 pounds) from the surface with sufficient velocity to escape the Earth's gravitational attraction. The payload delivery system includes an aircraft and a rocket system which is configured to be carried aloft by the aircraft. Utilizing an aircraft for the first portion of the payload delivery system has the advantage that a highly reliable and socially acceptable transportation mechanism will be used for moving small quantities of radioactive HLW from the present storage location and allowing the rocket system portion to launch over a remote location, for example. Further, the rocket system carried by the aircraft is novel in that it has one or more rocket stages that utilize one and only one single liquid propellant. Further, this one and only one propellant on a rocket stage provides for all necessary stage propellant functions, such as: main propulsion propellant (oxidizer and/or fuel), main propulsion ignition energy, and ullage pressurant gases (which in turn can be used to drive the main propulsion pump, provide for pump suction pressure and provide roll, pitch & yaw control thruster energy), for example. The single liquid propellant stage provides for high propellant mass fraction in a small package, which is advantageous in that it increases such mass fraction the most (hence more efficient) for payloads of a few pounds, for example.

The rocket system component contains a further novelty in that the final velocity increment imparted to the payload is imparted by use of pneumatic cannon. The pneumatic cannon uses the ullage or pressurization gases that would otherwise go underutilized in the last stage, for example. Because the payload is radioactive HLW the acceleration caused by the use of pneumatic cannon will not be harmful; in contrast to likely harm caused to a more sensitive payload, such as a satellite. In addition, the final destination for the payload is the Sun, for example, which has a very large gravitational attractive force and will be able to correct any pointing errors associated with the use of the pneumatic cannon.

DETAILED DESCRIPTION

As used herein, "aircraft" refers to a machine that is capable of flight by gaining support from the air.

As used herein, "propellant" refers to a substance or mixtures which are the working substance of rockets, which undergoes chemical and/or thermodynamic changes. For example, includes a substance that has the capacity for extremely rapid but controlled combustion that produces large volumes of gas at high pressure and high temperature. Propellants are designated by the storage condition just prior to use and may be gaseous or liquid, solid, or a combination of both which is referred to as "hybrid". Also includes those consumable substances which directly support utilization of propellants in a stage main propulsion engine, such as pressurants and/or substances that are used to drive pumps or pressurize systems, for example.

As used herein, "rocket" refers to a propulsive device that uses "propellant" as the source of energy for such propulsion and does not breathe air, for example.

As used herein, "propulsion" refers to a force that moves bodies that are initially at rest, changes of velocity, or overcomes retarding forces when a body is propelled through a medium, for example.

As used herein, "monopropellant" refers to a rocket propellant that decomposes when heated and/or catalyzed and the subsequent decomposition products can be used in a rocket without addition of another propellant, for example.

As used herein, "stage" refers to a basic modular building block of a rocket system which is self-contained in its capacity to generate propulsion, for example. Rocket systems or vehicles may contain one or more stages.

As used herein, "pneumatic cannon" refers to a device that propels and expels an object by use of pressurized gas propellant.

As used herein, "pressurant" refers to a propellant which stores energy in the form of pressure and in general practice is gaseous, but not necessarily.

As used herein, "stage main propulsion engine" refers to the element of a stage which imparts the main or majority of the propulsion of a rocket stage.

As used herein, "zoom maneuver" is an aircraft maneuver where horizontal kinetic energy is traded for potential energy in the form of altitude. Such a maneuver allows an aircraft to attain a higher altitude than is attainable under sustained climb. Also referred to as a "zoom climb".

As used herein, "ullage" refers to the portion of the interior of a tank containing a liquid which is not occupied by that liquid.

As used herein, "radioactive high level waste" refers to radioactive material which has a half-life in excess of 200,000 years. It is also meant as a general term to include materials such as spent nuclear fuel, for example.

As used herein, "escape velocity" refers to the minimum speed an object must obtain in order to break free of a planetary object.

Figure 1:
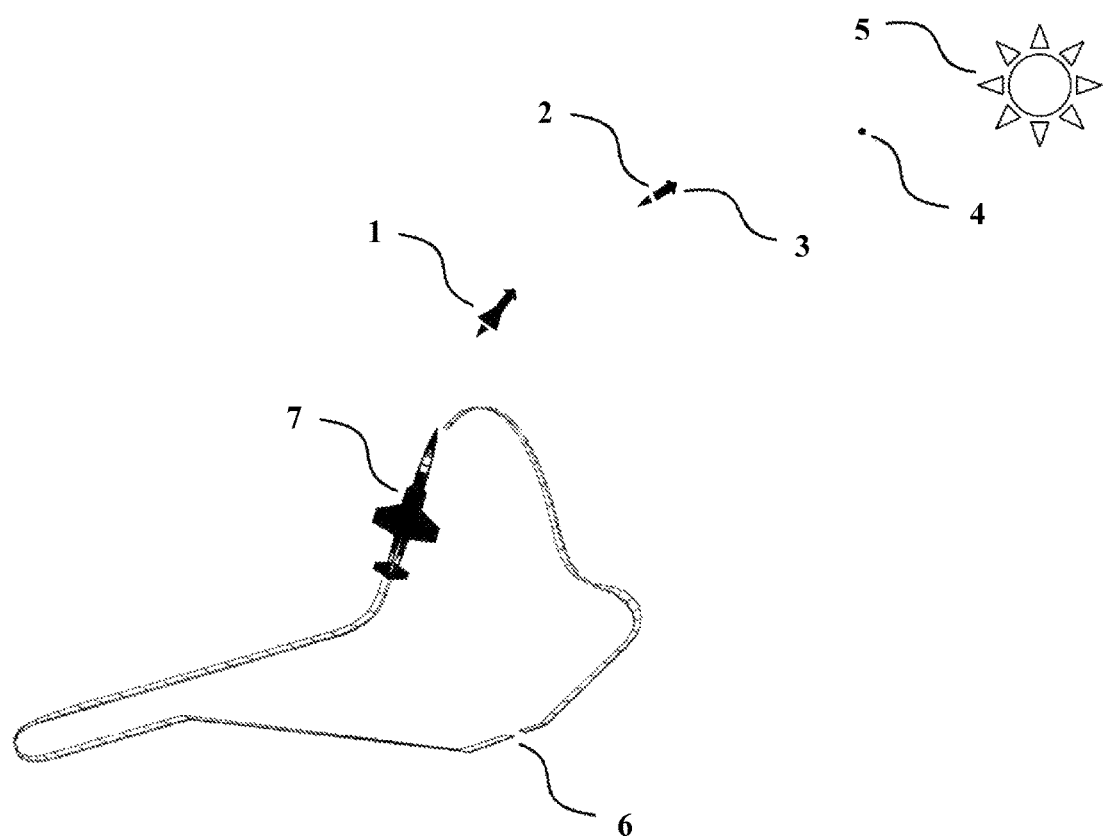
FIG. 1 illustrates one of the preferred embodiments which show a payload delivery system capable of launching a payload to the Sun.

Referring now to FIG. 1, in one embodiment, a flight path 6 which includes a runway on the Earth from which an aircraft 7 may take-off and land. The aircraft is capable of performing the zoom maneuver, where the aircraft 7 imparts a vertical velocity by increasing speed in horizontal flight and then pulling up on the flight path 6 before returning to a runway. The aircraft 7 is capable of carrying a rocket system comprised of stage 1, stage 2 and pneumatic cannon (elements 1, 2 & 3 respectively of FIG. 1). Stage 1 (element 1 of FIG. 1) is a solid rocket motor such as the sparrow missile, for example, which is capable of flying away from aircraft 7 during the zoom maneuver. Stage 2 (element 2 of FIG. 1) is the final rocket stage of the rocket system; this stage contains and utilizes one and only one single liquid propellant .At the termination of main propulsion of this final stage, the residual ullage gases are used as the energy source for the pneumatic cannon (element 3 of FIG. 1), for example. The payload 4 is hard encased radioactive HLW which has been propelled from pneumatic cannon 3 with sufficient velocity to escape the gravitational attraction of Earth. The payload 4 heads toward the Sun 5 where it is pulled into the Sun 5 and engulfed, thus storing the payload within the Sun, for example. The payload delivery system is comprised of elements 7, 1, 2 and 3 from FIG. 1, for example.

Referring again to FIG. 1, another embodiment uses a monopropellant as the single liquid propellant of stage 2 (element 2 of FIG. 1). The decomposition products of this monopropellant provide ullage gases, reaction control thrust, main thrust, and/or pumping energy, for example. In a further embodiment the monopropellant is hydrogen peroxide which may also act as an oxidizer source and/or ignition source for a hybrid stage main propulsion engine, for example.

Referring again to FIG. 1, another embodiment uses an aircraft 7 capable of supersonic flight, for example. U.S. military fighter aircraft such as the Lockheed F-104 Starfighter, the Douglas F4D Skyray. Modern fighter aircraft such as the McDonnell Douglas F-15 Eagle and the Lockheed Martin F-16 Fighting Falcon are also examples of such aircraft.

Figure 2:
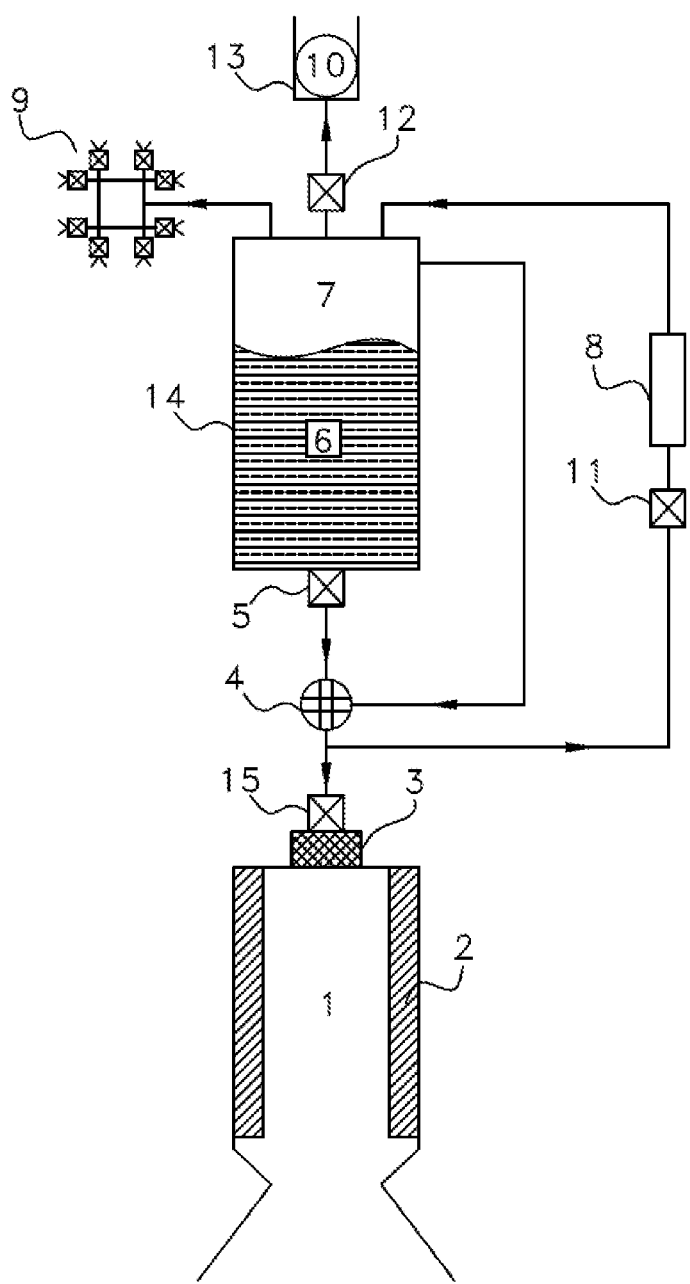
FIG. 2 illustrates one of the preferred embodiments which show a final rocket stage utilizing a single liquid propellant to provide all necessary stage propulsion and power requirements of a rocket system.

Referring now to FIG. 2, in one embodiment, a simple system schematic is provided for a rocket stage that utilizes a single liquid propellant 6, for example. The single liquid propellant tank 14 contains a single liquid propellant 6 and an ullage gas 7. In addition, for example, the rocket stage is also the final rocket stage of the payload delivery system and is configured utilizing a pneumatic cannon 13 on the ullage gas 7 end of the single liquid propellant tank 14, for example. The stage main propulsion engine 1 is shown in hybrid configuration with a solid propellant fuel 2, for example. The single liquid propellant 6 is comprised of a liquid hydrogen peroxide solution, for example. The single liquid propellant tank 14 contains the single liquid propellant 6 and ullage gas 7 sufficient to drive the single liquid propellant 6 out of the bottom of the single liquid propellant tank 14 and thru valve 5 and into pump 4, for example. Pump 4 utilizes the ullage gas 7 as propellant to further increase the pressure of the single liquid propellant 6 forcing it into the head end injection device 3 wherein it is decomposed or injected into the main propulsion engine 1 and utilized as oxidizer in hybrid rocket combustion, for example. In addition, for example the single liquid propellant 6 also flows through valve 11 and into decomposition device 8. For example, hydrogen peroxide decomposes into steam and oxygen which replenishes the ullage gas 7 and is the ullage gas 7 pressurant, for example. In addition the ullage gas 7 can be used as pressurant for flight control thrusters 9 as shown with individual valves and nozzles, for example. In addition at the end of the stage main propulsion engine burn time the isolation valve 5 is closed and the pneumatic cannon isolation valve 12 is opened allowing the ullage gas 7 to pressure charge the volume behind the payload 10 inside of the pneumatic cannon 13 which causes the payload 10 to be ejected from the stage much like a cannon, for example.

Referring again to FIG. 2, another embodiment uses a monopropellant and has the head end isolation valve 15 closed, while isolation valves 11 and 5 are open permitting stage self-pressurization of the single liquid propellant tank 14 by using decomposition products as ullage gas 7, for example.

Referring again to FIG. 2, another embodiment uses 90% hydrogen peroxide as the single liquid propellant 6, for example. The head end injection device 3 may be a catalytic bed comprised of silver which decomposes the hydrogen peroxide into oxygen and superheated steam at approximately 1400 F, for example. The temperature of the superheated steam and oxygen is sufficient to act as an ignition source with a solid fuel 2 polyethylene and initiate hybrid rocket combustion in the stage main propulsion engine, for example.

U.S. Pat. No. 6,921,051 B2 (Lopata & Kamel) discloses a payload delivery system for delivery of small satellites and space based instruments into orbital or suborbital altitudes and velocities. This disclosure is in contrast to the presently disclosed payload delivery system which concerns payload deliveries that have velocities greater than the escape velocity of Earth.

U.S. patent application Ser. No. 12/788,079 (Adinolfi) discloses a space disposal system and method for nuclear waste including Sun storage. The disclosed space disposal system includes a space elevator and rocket. This disclosure is in contrast to the presently disclosed flight system which uses an aircraft, rocket and pneumatic cannon in combination.

European patent application no. 92903385.0 (Bryzhinsky, et al.) discloses a method for disposal of radioactive waste in space into heliocentric (Earth) orbits. The disclosed method relates to the required velocity burns and specifics of the orbits including transfer orbits required for placement into the heliocentric orbit. The Bryzhinsky disclosure contains no details related to the propulsion elements or stages of the rocket other than details such as heat shields. In contrast the presently disclosed payload delivery system discloses the details of a payload delivery system which involve an airplane, at least one single liquid propellant stage rocket and pneumatic cannon for Sun burial of radioactive waste.

European patent application no. 92903384.3 (Bakanov, et al.) discloses the space module for disposal of radioactive waste in space. The application is the companion disclosure of European patent application no. 92903385.0 (Bryzhinsky, et al.) and discloses the features of an insertion module that provides thermal and radiation protection as well as safe emergency recovery in the event of failure of a boosting rocket pod such as the space shuttle. The insertion module is installed on an insertion device which places the module into Earth orbit where the insertion module then provides propulsion from an insertion stage for orbit transfers. This disclosure is in contrast to the present disclosure which utilizes an air breathing (non-rocket) initial stage and also utilizes as a final stage a pneumatic cannon and which stores the radioactive waste within the Sun not in a heliocentric orbit.

Although the present disclosure and its advantages have been described in detail, it should be understood that various changes, substitutions, additions, and alterations can be made herein without departing from the spirit and scope of the present disclosure, and/or as defined by the appended claims. Accordingly, one or more of the appended claims can include within their scope such processes, devices, manufacture, compositions of matter, means, methods, or steps.

The invention claimed is:

1. A payload delivery system to deliver a passive payload, of radioactive waste, from the Earth's surface by propelling said payload in excess of the Earth's escape velocity to allow capture by the Sun's gravitational force, said payload delivery system comprising:
   A. one or more rocket systems, wherein each of said one or more rocket systems is a two-stage rocket system, wherein said first stage includes a rocket main propulsive engine and propellant; and
   B. said two-stage rocket system including a decomposition device;
   C. a final stage of said two-stage rocket system, wherein said final stage includes both a pneumatic cannon and a hybrid rocket main propulsive engine, said hybrid engine including a solid propellant fuel and a single liquid propellant of hydrogen peroxide;
   D. wherein said single liquid propellant of hydrogen peroxide is a source both for propellant for said final stage and also oxidizer for said single hybrid rocket main propulsive engine; wherein further said single liquid propellant is utilized to generate ullage pressurant as energy for all required pump and control thruster operation of said final stage; and ullage pressurant is a sole source for pressurizing said single liquid propellant;
   E. wherein said decomposition device decomposes said single liquid propellant to generate ullage pressurant during operation of said single hybrid rocket main propulsive engine; and
   F. a aircraft operable to fly, wherein said aircraft: includes at least one air-breathing engine for propulsion, and is operable to carry said one or more rocket systems; and
   G. said payload delivery system comprising further limitations wherein:
      i. each of said one or more rocket systems is configured to be launched from said aircraft while said aircraft is in supersonic flight; and
      ii. each of said one or more rocket systems is configured to carry a single payload, wherein said payload is high level radioactive waste and is configured to have a mass of less than ten pounds; and
      iii. each stage of said two-stage system is configured to propel said payload away from said aircraft; and
      iv. wherein said payload of high level radioactive waste is configured to be ejected from the final stage via utilizing said pneumatic cannon which is configured to eject said payload utilizing said single liquid propellant of hydrogen peroxide, wherein ullage pressurant as energy for said cannon is generated by decomposition of said single liquid propellant by said decomposition device; and
      v. said pneumatic cannon in ejecting said payload is configured to impart a final velocity increment to said payload to accelerate said payload away from said final stage to a speed exceeding the Earth's escape velocity to allow capture of said payload by the Sun's gravitational force.

2. The system of claim 1 wherein said payload is shaped as a sphere or a rod.

\* \* \* \* \*